United States Patent [19]
Adler et al.

[11] 3,991,613
[45] Nov. 16, 1976

[54] SENSING ELEMENT FOR FLOW METER

[75] Inventors: Meryle D. W. Adler, Bradford, Pa.;
John T. Brown, Corning, N.Y.

[73] Assignee: Corning Glass Works, Corning, N.Y.

[22] Filed: Mar. 10, 1975

[21] Appl. No.: 556,811

[52] U.S. Cl. .......................................... 73/194 VS
[51] Int. Cl.² ......................................... G01F 1/32
[58] Field of Search ............ 73/194 B, 204, 194 VS; 338/34

[56] References Cited
UNITED STATES PATENTS

| | | | |
|---|---|---|---|
| 2,870,305 | 1/1959 | Ling | 73/204 |
| 3,121,853 | 2/1964 | Jason | 338/34 |
| 3,498,127 | 3/1970 | Richards | 73/204 |
| 3,550,057 | 12/1970 | Young | 338/34 |
| 3,564,915 | 2/1971 | Tomota et al. | 73/194 |
| 3,645,132 | 2/1972 | Rasmussen | 73/194 |
| 3,693,438 | 9/1972 | Yamasaki et al. | 73/194 |
| 3,709,035 | 1/1973 | De Fries et al. | 73/204 |
| 3,810,388 | 5/1974 | Cousins et al. | 73/194 |

OTHER PUBLICATIONS

Sharpsteen "Fluid Amplifier Measures Flow Velocity" in Control Engineering 1/66.

*Primary Examiner*—Herbert Goldstein
*Attorney, Agent, or Firm*—William J. Simmons, Jr.; Walter S. Zebrowski; Clarence R. Patty, Jr.

[57] ABSTRACT

A sensing element for measuring fluid flow comprising an elongated cylindrically-shaped support on which is disposed two resistive films having high TCR values. The support is symmetrical about a plane parallel with the direction of flow, and one of the resistive films is disposed on each side of that plane. The films are less than 10,000 A thick, thereby possessing a high ratio of surface area to thermal mass. These films are quickly cooled by pressure variations accompanying the generation of vortices in the fluid stream, and they are therefore capable of operating at high frequencies.

5 Claims, 7 Drawing Figures

SENSING ELEMENT FOR FLOW METER

CROSS-REFERENCE TO RELATED APPLICATION

This application is related to U.S. patent application Ser. No. 566,810 entitled "Flow Meter" filed in the name of M. D. W. Adler et al. on even date herewith.

BACKGROUND OF THE INVENTION

This invention relates to flow metering apparatus of the type wherein an elongated object in a stream of flowing fluid produces a wake including a distinct pattern of vortices, referred to as Karman's vortices, which are alternately shed from opposite sides thereof in a periodic manner. There is a definite relationship between frequency $f$ of shedding of the vortices, the dimensions of the object and the velocity V of the fluid stream. For example, consider the geometry which has been the object of most studies of the shedding phenomenon, viz., a right circular cylinder of diameter D. The shedding frequency f is expressed by $$f = KV/D \qquad (1)$$

where $K$ is a constant when flow is within a certain range of velocity $V$. Thus, velocity can be determined by measuring the frequency f of the generation of the vortices. For a general discussion of vortex generation, reference may be made to *Boundary Layer Theory* by H. Schlickting, 4th Edition, McGraw-Hill Book Co., Inc., pps. 27–34. That text indicates that for Reynolds numbers above about 600, the Strouhal number is constant and the relationship expressed by equation 1 will be valid. This linearity between Reynolds number and Strouhal number prevails for Reynolds numbers up to about $4 \times 10^5$ at which point the distinct pattern of vortices is replaced by random eddys. Vortex generating elements having noncircular cross-sections are taught in U.S. Pat. No. 3,572,117 issued Mar. 23, 1971 to A. E. Rodely and U.S. Pat No. 3,693,438 issued Sept. 26, 1972 to H. Yamasaki et al. The sharp edges of the vortex generating elements of the latter patent are said to improve the correspondence of vortex production rate with flow velocity over wide conditions of flow.

Various techniques, both electrical and mechanical, have been employed for producing electrical signals responsive to the rate of vortex production. To avoid the use of moving parts, electrical transducers are usually preferred. The vortex generating element itself sometimes contains passages through which an alternating fluid flows corresponding to the alternate shedding of vortices by the vortex shedding element. This type of vortex shedding element further contains means responsive to the alternating flow of fluid to produce an electrical output. Such shedding elements are costly and complicated because of the passages and flow sensing elements disposed therein. Moreover, the cross-sectional area of such shedding elements may be greater than desired because of the volume of the contents thereof, such elements thereby excessively impeding the flow of fluid through the channel in which they are disposed.

A simple and reliable flow sensing arrangement is disclosed in Paper No. 2-16-187 entitled "The Vortex Shedding Flow Meter" by D. S. White et al. presented at the 1971 Symposium on Flow-Its Measurement and Control in Science and Industry. The flow meter disclosed in that paper, which has been employed in the metering of numerous types of fluids and gases, comprises an elongated bluff body vortex shedding element having a frontal surface containing two thermisters, one on each side of the center thereof. For that flow meter to operate successfully the shedding element must have a frontal width which is an appreciable fraction, typically approximately one-third, of the diameter of the pipe across which it is placed. The thermisters occupy only a small fraction of the area of the frontal surface. The large area occupied by the frontal surface significantly impedes the flow of fluid, thereby causing a large pressure drop.

SUMMARY OF THE INVENTION

It is an object of the present invention to provide a simply constructed element which is capable of both generating and sensing Karman's vortices when disposed in a fluid stream. Another object is to provide a device capable of measuring the rate of fluid flow without causing a large pressure drop in the fluid stream. Yet another object is to provide a sensor capable of responding to vortices that are produced at very high rates.

Briefly, the flow metering apparatus of the present invention comprises means defining a chamber which is adapted to conduct fluid in the direction of the longitudinal axis thereof. As elongated, cylindrically shaped substrate extends between opposed surfaces of the chamber defining means transverse to the longitudinal axis thereof, the substrate having a nonconductive surface. A pair of thin resistive films are symmetrically disposed on opposite sides of the surface of the substrate, the films having thicknesses less than 10,000 A and having a resistivity that varies with temperature. Means are connected to opposite ends of the films for causing a current to flow therethrough that is sufficient to heat the films. Means are provided for detecting the periodic changes in resistance of the films as vortices generated by fluid flowing past the substrate causes differential cooling of the resistive paths, the electrical output from the detecting means providing an indication of the velocity of the fluid stream.

DETAILED DESCRIPTION

Figure 1:
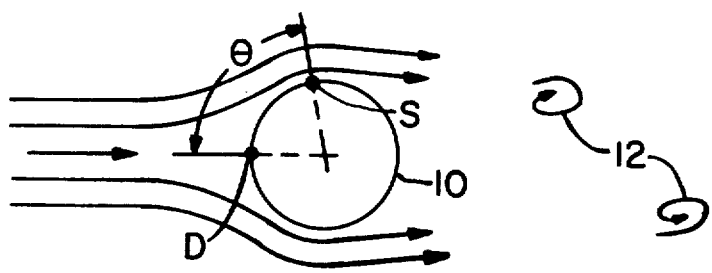
FIG. 1 is a diagramatic illustration of the formation of vortices by an element disposed in a fluid flow.

FIG. 1 shows a cylindrical element 10 transversely disposed in a fluid stream represented by the arrows. The stream separates into two parts at the stagnation point D, these parts flowing around opposite sides of the cylinder. The flow velocity at the cylinder surface increases as the flow moves away from stagnation point D until the boundary layer of the fluid separates from the cylinder surface at the point of separation S. Downstream from point S, vortices alternately form on opposite sides of cylinder 10 to produce the well-known Karman vortex street. The point of separation S periodically varies as the vortices are produced. Point S oscillates about an average position which varies somewhat with flow velocity, this point being located at an angle $\theta$ within a range of 75° to 85°, wherein $\theta$ is the angle between radii passing through points D and S.

Figure 3:
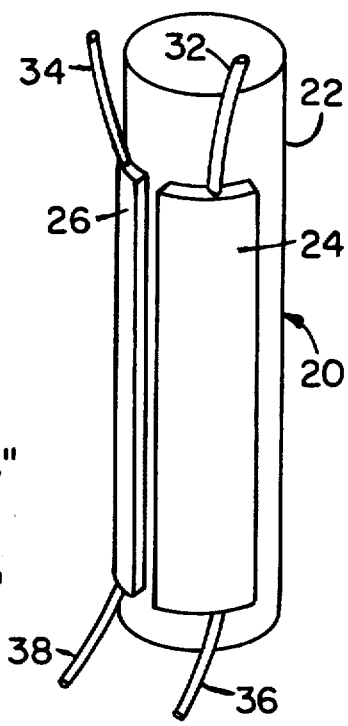
FIG. 3 is an oblique view of the sensor element of FIG. 2.
Figures 2, 4, 5:
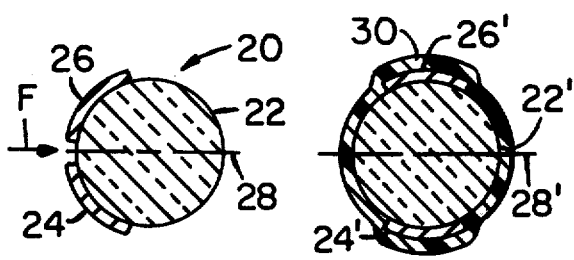
FIG. 2 is a cross-sectional view of a flow sensor element constructed in accordance with the present invention.
FIGS. 4 and 5 are cross-sectional views of further embodiments.

In accordance with the present invention the vortices being shed by a cylindrically shaped shedding element or substrate are detected by thin films of resistive material disposed on the shedding element. By "thin films" is meant films having a thickness less than 10,000 A. Referring to FIGS. 2 and 3 flow sensing element 20 comprises a substrate 22 which may consist of nonconductive material or conductive material having a nonconductive surface layer. The substrate material should have a low thermal conductivity so that it does not conduct away heat from the thin resistive films disposed on the surface thereof. The substrate may consist of glass, ceramic, plastic, insulated metal or the like. In addition to the circular substrate illustrated, the cross-sectional shape of the substrate may have any one of various noncircular shapes including elliptical and those sharp edged shapes disclosed in the aforementioned U.S. Pat. No. 3,693,438. The substrate may have any shape that is symmetrical with respect to a plane parallel to the direction of flow (arrow F in FIG. 2) provided that such shape is capable of generating a continuous, nondistorted Karman vortex street flow pattern. The plane of symmetry in FIG. 2 is represented by broken line 28.

As vortices are shed by substrate 22 in response to the fluid stream impinging thereon, out of phase pressure variations occur on opposite sides of the substrate. These pressure variations are detected by resistive films 24 and 26 which are symmetrically disposed on substrate 22 with respect to plane 28. The width of each resistive film preferably occupies less than one-fourth of the periphery of the substrate cross-section. The films can be disposed on the upstream surface of the substrate, as shown in FIGS. 2 and 3, or they can be disposed on opposite sides or on the downstream surface as illustrated in FIGS. 4 and 5, respectively, wherein elements similar to those of FIG. 2 are represented by primed and double primed reference numerals, respectively.

Thin films 24 and 26 may consist of any electroconductive material which has a high TCR value and which can be formed in films having thicknesses less than 10,000 A. By high TCR value is meant a positive or negative temperature coefficient of resistance greater than 500 ppm/° C. Films 24 and 26 can be formed by depositng a metallic film on substrate 22 by any suitable method such as evaporation, sputtering, electroless plating or the like. Metal oxides having suitable TCR values can be deposited by reactive sputtering. A preferred resistive film and a method of making the same are disclosed in our copending application Ser. No. 507,284 entitled "Temperature Sensing Device and Method" filed Sept. 19, 1974. In accordance with the method of that application, a first film or coating of an adherent electro-conductive metallic oxide is applied over the exterior surface of the substrate. The metal oxide coating is thereafter thoroughly cleansed and a second coating or layer of a metal having a relatively high temperature coefficient of resistance is applied over the metallic oxide film so as to form a strong physical bond as well as a chemical bond therebetween. The composite so formed is fired at a temperature up to about 750° C.

FIG. 4 illustrates that a thin protective coating 30 of nonconductive material such as glass, plastic or the like may be disposed on the surfaces of the resistive films. Coating 30 should be as thin as possible and yet be continuous. The thickness of the coating should not exceed 0.001 inch since greater thicknesses will severely dampen the response of the resistive films to the flowing fluid. Polyimide films have functioned quite well. Other plastic materials which can be employed are epoxies, silicones, teflons and the like.

Various known techniques may be employed to pattern the thin resistive films which form sensors 24 and 26. The entire surface of substrate 22 may be initially coated with a film of resistive material. Individual sections of film can then be formed by removing portions of the initially deposited film by chemical or mechanical techniques. For example, certain portions of the film can be masked with an etch-resistant material prior to subjecting the substrate-film combination to an etchant which removes the unmasked portions of the film. Unwanted portions of a film could also be removed by directing a laser beam thereon. Films 24 and 26 could also be formed by applying a release material such as a slurry of clay to selected portions of the substrate by suitable means such as offset printing. The substrate coated in this manner is subjected to a process such as chemical vapor deposition which forms at least a part of films 24 and 26. That part of the film material deposited over the slurry does not adhere to the substrate and is easily removed along with the slurry. Depending upon the material so deposited, it may itself function as a high TCR resistive film, or additional layers may be deposited on the surface of the initially deposited films by means such as electrodeposition in order to provide films having the desired properties, as disclosed in the aforementioned patent application Ser. No. 507,284.

Substrate 22 may be provided with end caps each having a plurality of conductive terminal portions, a respective terminal portion contacting the end of one of the resistive films. Alternatively, electrical connection can be made to the ends of the resistive films by soldering conductive leads 32, 34, 36 and 38 thereto, as shown in FIG. 3.

Figure 6:
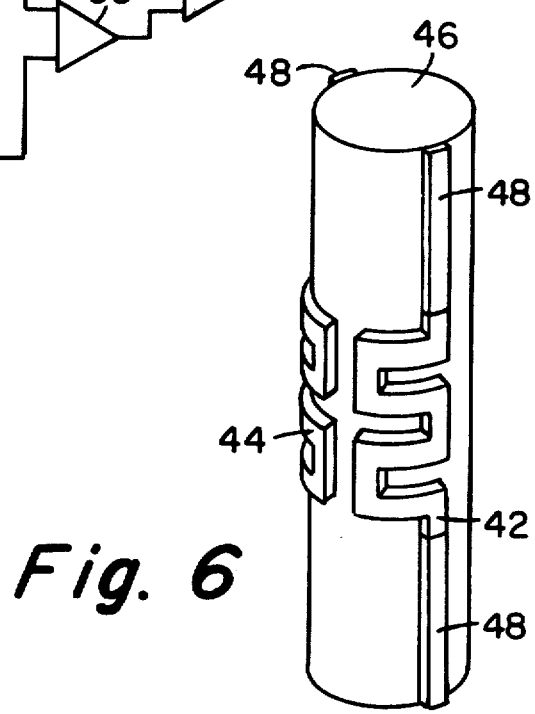
FIG. 6 is an oblique view of a sensor element having patterned resistive films.

It may be advantageous, under certain conditions of flow to measure the flow only at a small area within a duct. For example, the flow rate may be nonuniform across the duct, and it may be desirable to measure the flow rate at the center of the duct. To make such measurements, the sensing resistive films may be of the type illustrated in FIG. 6 wherein resistive films 42 and 44 are disposed on the central portion of cylindrical substrate 46. Since films 42 and 44 extend only a short distance along the length of the cylinder, it may be necessary to pattern the films in a zig-zag or serpentine pattern to increase the resistances thereof to the desired values. Conductive paths 48 extend from films 42 and 44 to the ends of substrate 46 where electrical connection can be made thereto as previously discussed.

Figure 7:
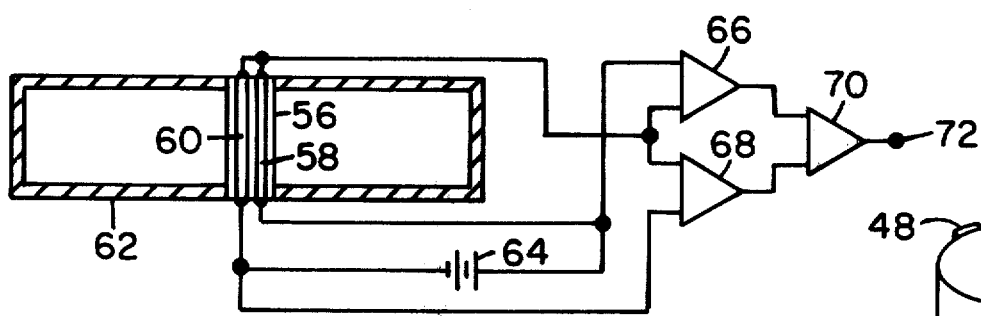
FIG. 7 is a schematic diagram of a flow metering apparatus.

FIG. 7 shows a flow measuring system in which the sensing element of the present invention may be employed. A flow sensing element consisting of substrate 56, on which are disposed thin resistive films 58 and 60, is disposed in the center of duct 62. As stated hereinabove, films 58 and 60 may be located on the upstream, downstream or lateral surfaces of the substrate, but they must be symmetrically disposed with respect to the plane of symmetry which is parallel to the direction of flow and passes through the center of the substrate. Films 58 and 60 are connected in series across source 64 of dc voltage. Current flowing through the sensing resistors heats them to a temperature above ambient and provides the voltage drops across these resistors which are sensed by the output circuitry. The voltage drops across resistors 58 and 60 are coupled to differential amplifiers 66 and 68, respectively, and the output signals from these amplifiers are coupled to a subtracting amplifier 70. This circuit adds the signals from resistors 58 and 60 and substantially cancels the in-phase noise components. The frequency of the output signal appearing at terminal 72 is indicative of the rate of flow of fluid past the sensing element.

The vortices generated by substrate 56 cause pressure variations to occur in the vicinity of the substrate which can be detected by films disposed on the upstream, lateral or downstream surfaces of the substrate. These pressure variations occur on opposite sides of the substrate where they cause the heated resistive films to alternately cool. Therefore, as the resistance of one film increases, the resistance of the other film decreases, and then the process reverses. When the resistive films were disposed on the upstream surface of the substrate, the output signal was more consistent and had a relatively low noise content. Resistive films disposed on the downstream surface of the substrate produced signals having greater amplitude, but they were less consistent and had a lower signal-to-noise ratio. Since the resistive films are less than 10,000 A thick they possess a high ratio of surface area to thermal mass, thereby enabling them to quickly respond to pressure variations. This feature is especially important when the resistive films must respond to high rates of vortex generation. In addition to improved high frequency response, the thin film sensor of the present invention requires less input power from source 64 since the improved cooling efficiency permits the resistive films to be operated at a lower temperature differential above the ambient temperature of the fluid. Furthermore, these resistive films possess a high resistance to breakage considering their low thermal mass.

We claim:

1. Flow metering apparatus comprising
means defining a chamber which is adapted to conduct fluid in the direction of the longitudinal axis thereof,
an elongated cylindrically shaped substrate extending between opposed surfaces of said chamber defining means transverse to said longitudinal axis, said substrate having a nonconductive surface,
a pair of thin resistive films symmetrically disposed on opposite sides of the upstream surface of said substrate and extending substantially the entire distance between said opposed surfaces of said chamber defining means, said films having thicknesses less than 10,000 A, having a resistivity that varies with temperature, and comprising a first coating of an adherent electroconductive metallic oxide disposed on the surface of said substrate and a second coating of metal disposed on said first coating,
means connected to opposite ends of said films for causing a current to flow therethrough that is sufficient to heat said films, and
means for detecting the periodic changes in resistance of said films as vortices generated by the fluid flowing past said substrate cause differential cooling of said films and for providing an electrical output indicative of the velocity of said fluid stream.

2. An apparatus in accordance with claim 1 further comprising a coating of nonconductive material disposed on the surfaces of said resistive films, the thickness of said nonconductive coating being less than 0.001 inch.

3. Flow metering apparatus comprising
means defining a chamber which is adapted to conduct fluid in the direction of the longitudinal axis thereof,
an elongated cylindrically shaped substrate extending between opposed surfaces of said chamber defining means transverse to said longitudinal axis, said substrate having a nonconductive surface,
a pair of thin resistive films symmetrically disposed on opposite sides of the surface of only the central portion of said substrate, said films having thicknesses less than 10,000 A, having a resistivity that varies with temperature, and being patterned in a zig-zag manner,
means connected to opposite ends of said films for causing a current to flow therethrough that is sufficient to heat said films, and
means for detecting the periodic changes in resistance of said films as vortices generated by the fluid flowing past said substrate cause differential cooling of said films and for providing an electrical output indicative of the velocity of said fluid stream.

4. An apparatus in accordance with claim 3 wherein said resistive films comprise a first coating of an adherent electroconductive metallic oxide disposed on the surface of said substrate and a second coating of metal disposed on said first coating.

5. An apparatus in accordance with claim 4 further comprising a coating of nonconductive material disposed on the surfaces of said resistive films, the thickness of said nonconductive coating being less than 0.001 inch.

* * * * *